United States Patent [19]

Willey et al.

[11] Patent Number: 4,834,411

[45] Date of Patent: May 30, 1989

[54] APPARATUS FOR RECLINING WHEELCHAIRS FOR SHAMPOOING CHAIR OCCUPANTS

[75] Inventors: Leone V. Willey; Donald L. Willey, both of 1606 17th Street Southwest, Jamestown, N. Dak. 58401; Ivyl D. Kopecky, Ypsilanti, N. Dak.; Ronald Stoltenberg; Patrick D. Bennett, both of Jamestown, N. Dak.

[73] Assignees: Leone V. Willey, Jamestown, N. Dak.; Donald L. Willey, Jamestown, N. Dak.

[21] Appl. No.: 152,747

[22] Filed: Feb. 5, 1988

[51] Int. Cl.4 .................................... B62M 1/14

[52] U.S. Cl. .................................... 280/250.1; 297/310; 297/DIG. 4

[58] Field of Search ................ 280/242 WC; 414/678; 297/310, DIG. 4

[56] References Cited

U.S. PATENT DOCUMENTS 620,078 2/1899 Ray .................................... 248/351
3,256,040 8/1964 Mize et al. .......................... 297/310
4,227,740 10/1980 East .................................... 297/310
4,339,013 7/1982 Weigt .................................. 180/6.5
4,389,056 6/1983 Tenniswood ............... 280/289 WC
4,527,944 7/1985 Qually et al. ........................ 414/678
4,592,695 6/1986 McConnell ......................... 414/678
4,725,188 2/1988 Zimmerman et al. .............. 414/678
4,726,730 2/1988 McConnell ......................... 414/678

*Primary Examiner*—Kenneth R. Rice
*Attorney, Agent, or Firm*—Kinney & Lange

[57] ABSTRACT

A stand is made so that is can be installed or positioned adjacent to a sink, and has a tilt frame portion attachable to the frame of a wheelchair and operable to tilt or recline the wheelchair relative to a base frame so that a person in the wheelchair can conveniently have a shampoo at a sink basin. The wheelchair is first secured to the tilt frame with clamps. The stand includes an actuator that is operable to positively and safely tilt the tilt frame to recline the wheelchair rearwardly while a person is occupying the chair, so that the person's head will be adjacent and overlying the sink basin.

17 Claims, 6 Drawing Sheets

33
22
23
25
26
27
21
37
97
76
121
150
95
58
120
118
42
43
142
117
92
11
40
36
50
116
13
133A
136A
133
114
70
70
70
69
68
130
136
131
135

APPARATUS FOR RECLINING WHEELCHAIRS FOR SHAMPOOING CHAIR OCCUPANTS

BACKGROUND OF THE INVENTION

1. Field of the Invention

The present invention relates to a stand that clamps to wheelchairs and tilts or reclines the wheelchair rearwardly, particularly for occupant shampooing.

2. Description of the Prior Art

Reclining wheelchairs have been known in the prior art, that is, wheelchairs which have a reclining back, and some chairs also have lifts for the chair leg and foot supports when the back reclines. There have also been attachments that have been used for reclining and holding wheelchairs in tilted or reclined position, but many of these provide a relatively unsafe sensation to the occupant of the chair, and are not power operated.

U.S. Pat. No. 3,256,040 issued to Mize et al. shows a reclining attachment for a wheelchair which comprises a pair of rearwardly extending legs fixed to the chair that will engage the ground and stop the wheelchair when the wheelchair is tilted rearwardly. The chair tilts on the wheels, and the amount of tilting is adjustably through the adjustment of the legs. It is manually operated.

U.S. Pat. No. 4,227,740 shows two U-shaped tubular members that attach onto a wheelchair and which will stop the wheelchair from tilting rearwardly more than a desired amount. It enables a wheelchair to be reclined rearwardly, but is manually operated and attaches to the handles which are provided for people who push the wheelchairs.

A chair support is shown in U.S. Pat. Ser. No. 620,078 which will hold a chair rearwardly stopped for reclining. It too is used with a non-wheeled chair and there is no teaching of use with a wheelchair, nor is there any teaching of use for reclining wheelchairs when shampooing the occupant.

U.S. Pat. No. 4,339,013 shows a reclining wheelchair in which the reclining mechanism is built into the wheelchair and is hydraulically operated for reclining the back of the wheelchair and the footrests of the wheelchair. The chair then can be stretched out so that it assumes a shape substantially like a bed or cot. In other words, the backrest and leg supports will pivot relative to the seat, much like a reclining a living room chair.

U.S. Pat. No. 4,389,056 shows a motorized wheelchair tie-down system developed for use in vehicles for restraining drivers or passengers that are confined to a wheelchair. The device does secure the wheelchair automatically when it is in place, and tilts the wheelchair slightly during use but does not show full support for reclining the chair.

Thus, none of the prior art shows a stand that can be clamped positively to the frame of an existing wheelchair and tilt the stand and wheelchair rearwardly while a backrest is provided to support the patient and give a sense of security. The stand of the present invention is of size so that is can be positioned adjacent a wash basin for permitting an operator to move a wheelchair into position and tilt the chair for shampooing an occupant's hair.

SUMMARY OF THE INVENTION

A power operated stand clamps and securely retains a standard wheelchair and includes a tilting mechanism for tilting the wheelchair rearwardly. The stand is portable, and includes a pair of rear wheels and a center forward wheel that fits under the wheelchair seat, adjacent to the leg rests. The stand has clamps or latches that will engage the frame of a chair to hold it securely so that the chair will be held without any likelihood of unintended release. An actuator is operated under power to tilt the stand and the clamped-in-place wheelchair rearwardly, to position the wheelchair and the head of a person in the chair adjacent and above a washbasin for shampooing the seated person's hair.

The stand includes a firm backrest that engages the back panel of the chair to provide a support for the back of a chair occupant, and the stand is made so that it is positioned to insure that there will be no likelihood of tipping, or going "over center" during the tilting operation.

A removable drain tray is utilized with the stand for shampooing, and a headrest can replace the tray if the stand is used for other purposes. The drain tray provides for a water catch pan and drain during the shampooing operation. The drain tray has a recess for receiving the neck of a person and the recess is lined with padding for comfort. The tray can be placed in position before tilting the stand.

The stand is very stable, easily operated, and provides adequate safety (by the chair occupant if desired) while simplifying substantially the task of having a shampoo while seated in a wheelchair.

DETAILED DESCRIPTION OF THE PREFERRED EMBODIMENTS

Referring first to FIGS. 1, 2, 3 and 6 in particular, a stand made according to the present invention in indicated generally at 10 and includes a base frame 11. The base frame 11 is made up of a number of components including a rear cross axle 12 (see FIG. 3) that has wheels 13,13 rotatably mounted on opposite ends of the cross axle 12. The wheels are mounted on suitable bearings and spindles in any desired way. Each of the wheels 13 has a foot operated brake that is schematically shown at 14. The brakes are conventional.

Figure 1:
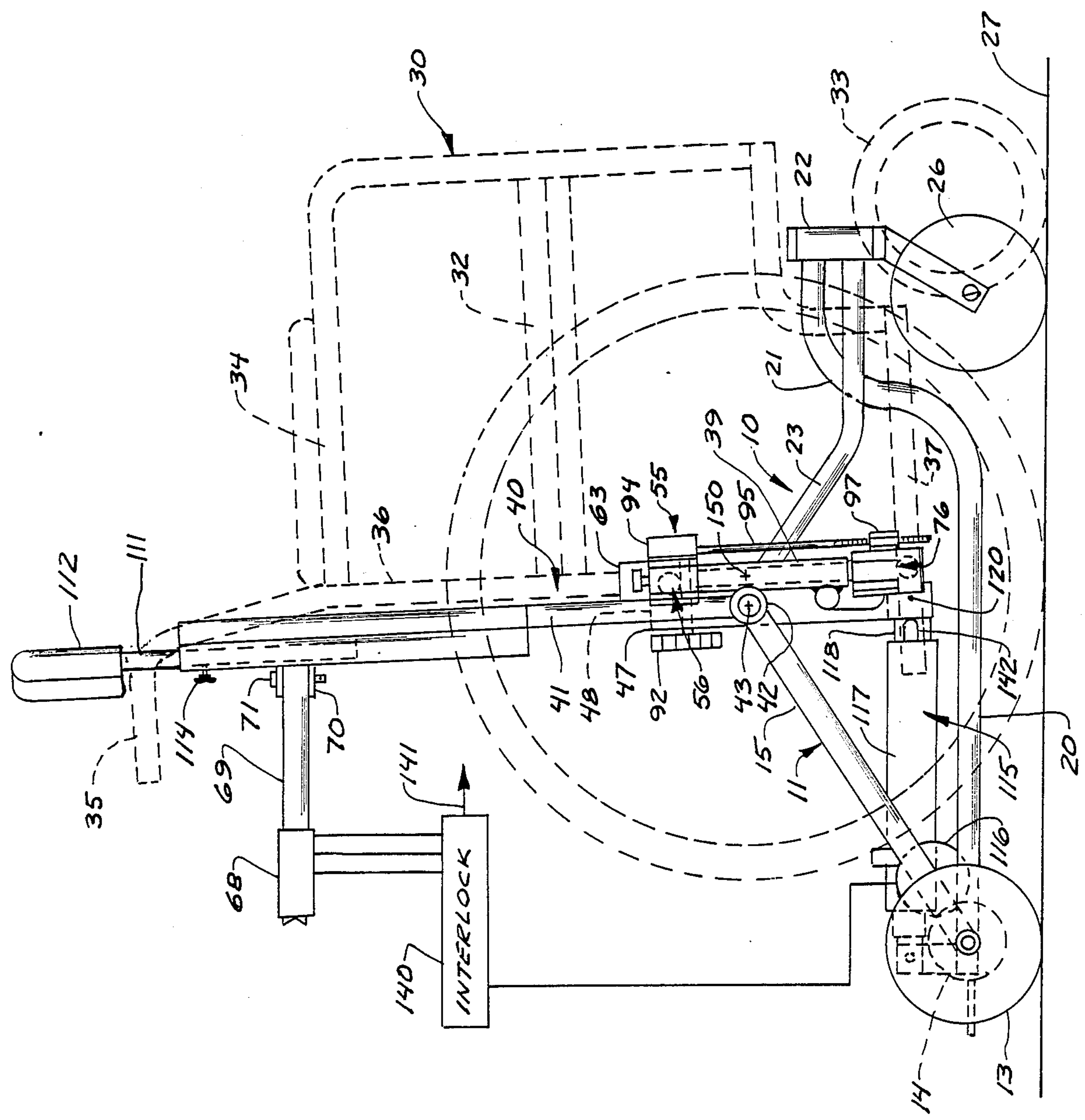
FIG. 1 is a side elevational view of a wheelchair reclining stand made according to the present invention with a standard wheelchair shown in dotted lines.
Figure 2:
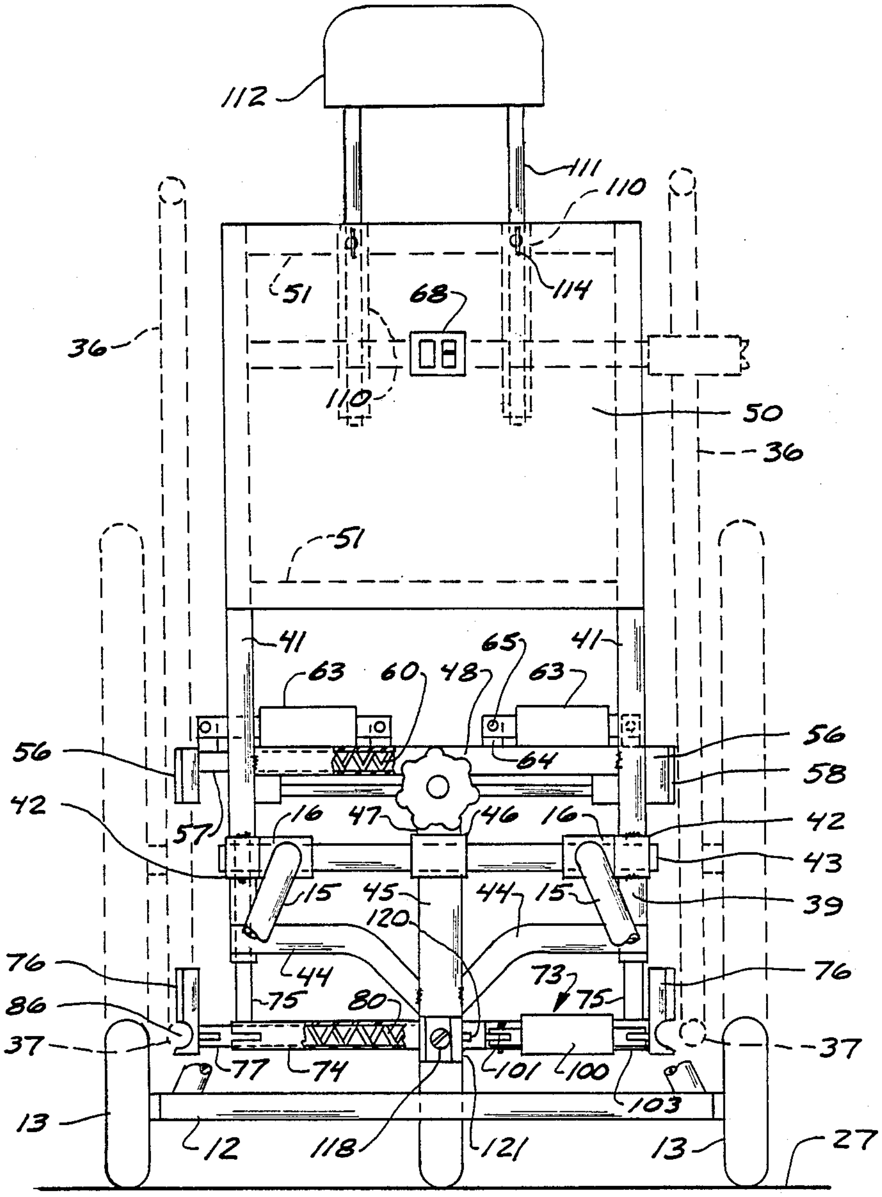
FIG. 2 is a rear view of the device of FIG. 1, with clamps on one side of the chair shown in actuated position and on the other side in a retracted position.
Figure 3:
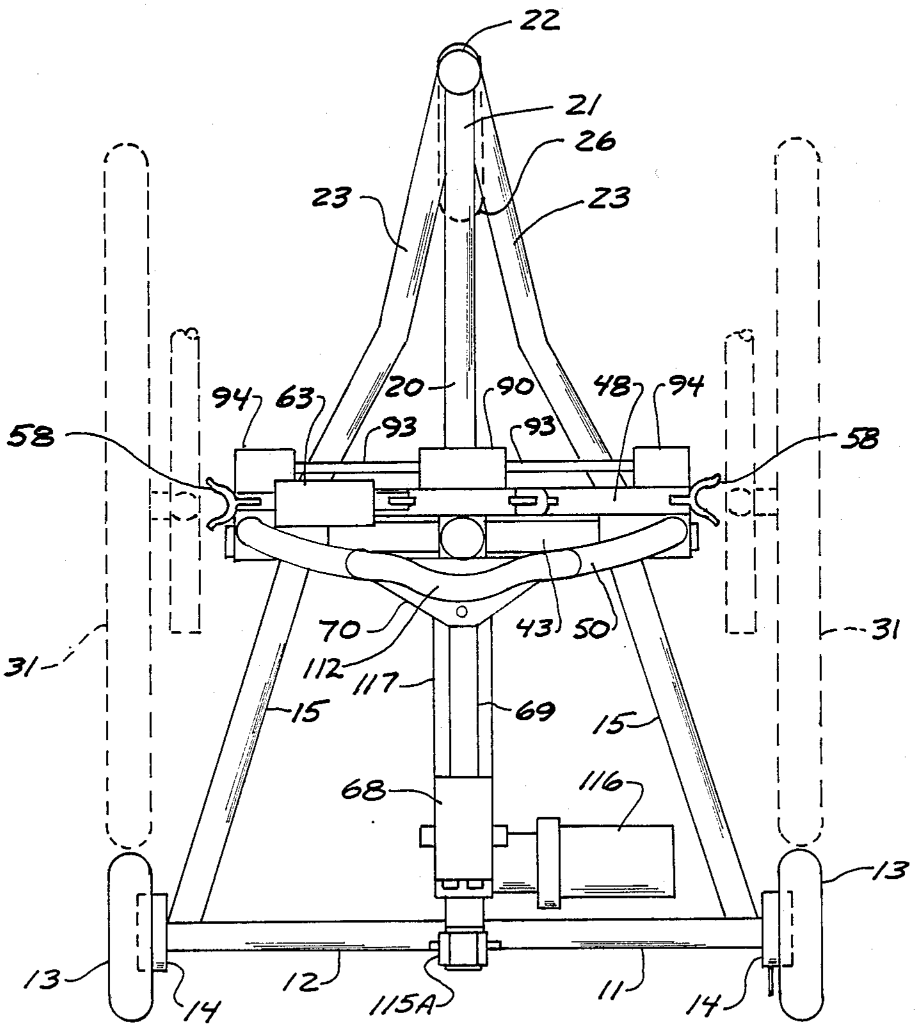
FIG. 3 is a top plan view of the stand of FIG. 1.
Figure 6:
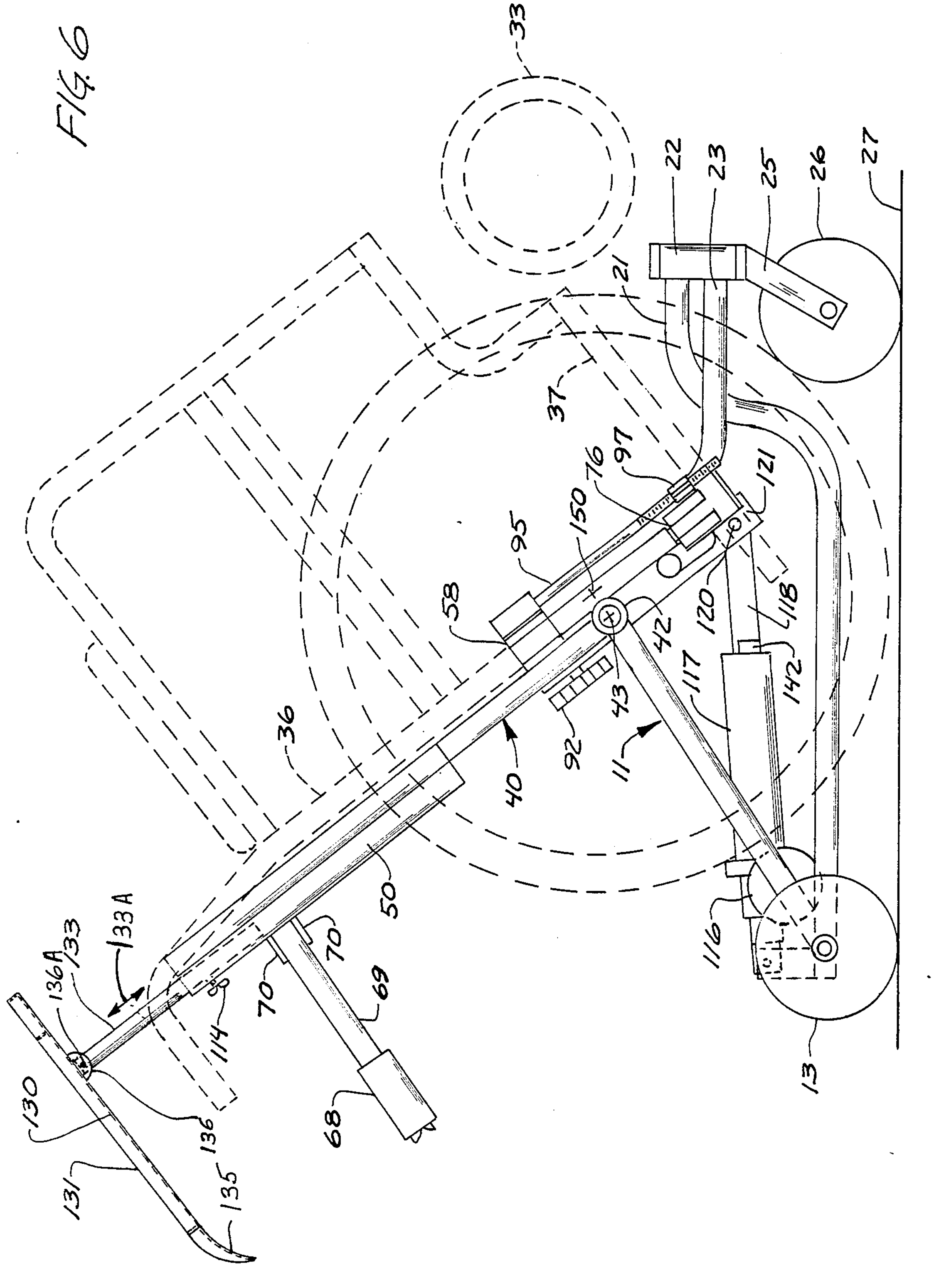
FIG. 6 is a side view similar to FIG. 1, but showing the stand in a position reclining the wheelchair with a drain tray in position.

The base frame 11 further includes a pair of frame arms 15,15 which are fixed to the cross axle 12 near the outer ends of the cross axle, as seen in FIG. 3. The frame arms 15 incline upwardly and forwardly as can be seen in FIGS. 1 and 6. These arms 15 are broken away in FIG. 2, but it can be seen that the upper ends thereof are welded or otherwise fixedly attached to a pair of hubs 16,16. These hubs 16 are used to provide a support for a cross shaft, as will be explained, for providing a pivot mounting for the reclining or tilting frame portion of the stand.

Additionally, the base or stand frame 11 includes a longitudinally extending frame member 20 which is welded or otherwise fixedly attached to the center of the cross axle 12, and extends forwardly as can be seen in FIGS. 1 and 6 and has a portion 21 which curves upwardly to position where it is welded to a hub 22 which has a vertical axis.

Additionally, the base frame 11 includes a pair of forward side frame members 23, which are fixed to the hub 22 below the frame portion 21. Members 23 have portions 23A that extends to be welded to the front sides of the hubs 16. Thus, the hubs 16 are supported by the frame members 15 and the frame members 23. The hubs 16 form pivot support members that are rigidly supported on the base frame 11. The frame members 23 also taper from hubs 16 in toward the center line of the base frame 11 for clearance purposes.

The front hub 22 mounts a caster wheel assembly 25 of conventional design. The caster wheel will caster about the vertical axis of the hub 22, and has a wheel 26 rotatably mounted thereon so that the wheels 13 and 26 will support the base frame 11 securely upon a supporting surface indicated generally at 27 comprising, for example, the floor of a beauty parlor or hair salon. The base frame 11 can be rolled therefore quite conveniently across floors, and the base frame members 15,15 as can be seen in FIG. 2, as well as the members 20 and 23 are positioned to be narrow enough to permit a wheelchair 30, the frame of which is shown in dotted lines, to be rolled to position over the base frame. The wheelchair wheels 31,31 have the same tread width as the wheels 13. The front portion of the frame 11 comprising front members 23 and the front portion 21 of the longitudinal member are narrow enough to fit under the seat 32 of such a wheelchair. The wheelchair 30 also has forward wheels 33 illustrated in dotted lines at FIG. 1, and armrests 34 as well as handles 35 for an assistant to use for maneuvering the wheelchair. The wheelchair 30 also includes generally upright frame members 36, and lower horizontal fore and aft extending frame members 37 forming a standard wheelchair frame. These are shown in dotted lines in FIGS. 1 and 6. The wheelchair seat 32 is also supported on horizontal members.

The reclining stand of the present invention includes a pivotally mounted recliner or tilt frame indicated generally at 40 that is pivotally mounted on the base frame 11. The tilt frame 40 forms a subassembly that clamps onto and holds a wheelchair that is indicated in dotted lines at 30, and which can be tilted about the axis of the hubs 16 to provide the reclining feature for shampooing an occupant of a wheelchair 30. The tilt frame 40 can perhaps best be seen by referring to FIGS. 1, 2 and 3, and has a pair of upright side frame members 41,41 on opposite sides thereof which have hubs 42 fixed on the frame members. The hubs 42 form pivot hubs that are rotatably mounted on a pin 43 that in turn is mounted through the hubs 16. In other words, the pin 43 forms the pivot shaft or pivot pin for the tilt frame 40 and is supported with respect to the base frame 11 through the hubs 16. The pivot shaft or pin 43 extends all the way across the frame 11 as shown in FIG. 2, so that it is supported in both of the hubs 16,16 and both of the hubs 42,42. The upright side frame members 41 are held together with a cross frame member 48 and a pair of lower braces 44 that are connected or welded to the lower portions of the frame members 41,41 and extend inwardly toward the central fore and aft axis of the tilt frame where an upright control arm 45 is mounted. The control arm 45 is suitably welded to the braces 44 and extends upwardly and a hub 46 is welded to arm 45. The housing 46 is rotatably (pivotally) mounted on the pin and helps support the pin 43. An upwardly extending arm portion 47 of arm 45 is fixed to the cross brace 48 if desired for rigidifying the lower portion of the frame.

The upper portions of the upright frame members 41 are used to support a back rest assembly 50 that is coupled to the upright frame members 41 in a suitable manner. The back rest is made so that it rigidifies the upper part of the tilting frame. Additional cross members shown in dotted lines at 51 can be provided to support the backrest as well. The back rest 50 is curved in top view for comfort of the patient.

Figure 4:
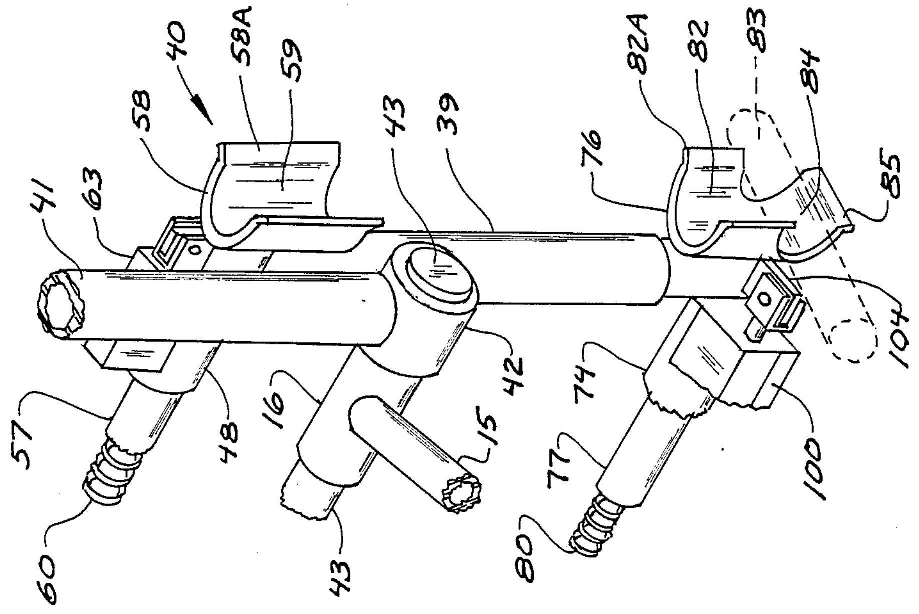
FIG. 4 is a fragmentary perspective view of a clamping assembly used with the present invention.

The intermediate cross member 48 is fixed to the forward sides of the upright frame members or tubes 41,41, and the ends of the cross member 48 have uprightly extending sleeve portions 39,39 welded thereto (see FIG. 4). The sleeve portions 39 are also fixed to hubs 42 which are connected to upright members 41. The sleeve portions are parallel to the respective side frame members 41 and extend downwardly from the side frame members 41. The cross member 48 and the sleeve portions 39 form part of a wheelchair clamping assembly 55. The clamping assembly 55 is made to clamp onto the frame members of a wheelchair. The clamping assembly includes clamps which will clamp or latch onto the upright frame members 36 of a wheelchair and simultaneously onto lower horizontal frame members such as those shown in dotted lines at 37. The height of the lower members of a wheelchair can vary from wheelchair to wheelchair, and thus the lower clamps are adjustable.

The cross member 48 is tubular, and at opposite ends thereof clamp assemblies 56 are mounted thereon. The clamp assemblies 56 comprise shafts 57 that are slidably mounted on the interior of the tube 48 and extend out from opposite ends thereof. A separate wheelchair frame receiving U-shaped clamp 58 is attached to the outer end of each of the shafts 57. These U-shaped clamps 58 have receptacles 59 that have axes that are generally upright, and are of size to slidably receive the upright frame side members 36 of a standard wheelchair. The clamps 58 are urged outwardly from the cross member 48 by strong latch springs 60, that are mounted on the interior of the cross member 48 and bear against the ends of the respective shaft 57, as can perhaps best be seen in FIG. 4 schematically. It can be seen that the clamps 58 have tapered outer edge lips 58A, as can be seen in FIG. 4, to tend to guide the clamps 58 onto tubular frame members 36 when a wheelchair is positioned aligning with the clamps.

The clamps 58, as can be seen, are normally urged outwardly by the springs 60, but are retracted when the tilt frame is to be used, through the use of solenoids 63. There is a separate solenoid 63 for each of the clamps 58, and the solenoids in turn are mounted on the cross member 48 and are anchored on upright ears 64 with pins 65 as shown. The ears 64 are fixed to the cross member 48. The solenoids have actuator yokes 66 at their outer ends. When the solenoids 63 are energized, they will retract the clamps 58 against the force of springs 60 to a position shown in FIG. 2 for the right-hand side, so that the energized solenoid 63 retracts its respective clamp 58 to a position where it will clear the interior edges of the upright frame members 37 of a standard wheelchair shown in FIG. 2.

The solenoids 63 are controlled through a switch control 68 that is mounted onto an arm 69 which in turn is pivotally mounted to brackets 70 with a pin 71. The brackets 70 are attached to the back of backrest 50 or in another desired location. The pivoting arm 69 permits the switch 68 to be moved from side to side for convenience of the operator and for clearance around a shampoo sink.

In addition to the cross member 48 and the clamps 58 as just explained, the clamp frame 55 includes a lower, vertically adjustable clamp subframe 73 that is made up of a cross member 74, which is parallel to cross member 48. The cross member 74 has a pair of upright guide tubes 75 fixed at opposite ends thereof, and the guide tubes 75 are slidably, telescopically mounted in the sleeves 39, which are attached to the cross member 84 and to the respective hubs 42.

The cross member 74 is tubular, and at each end there is a wheelchair lower frame clamp 76 mounted thereon. The wheelchair lower frame clamps 76 in turn are attached to shafts 77 that are slidably mounted in the cross member 74, and springs 80 are provided on the interior of the cross member 74 to urge the shafts 77 outwardly on each side so that the clamps 76 will tend to engage the wheelchair frame.

This can also be seen in FIG. 4 schematically, and it can be seen that the clamps 76 each have an upright axis U-shaped receptacle indicated at 82 with lips 82A that guide the lower portion of the vertical or upright frame member 36 into place at the same time it is being guided into the clamps 58. Thus, the axes of the U-shaped receptacles 59 of clamps 58 and the receptacles 82 of clamps 76 are aligned on the respective sides of the clamping assembly 55.

The clamps 76 further have notches 83 cut on the side walls of the clamp, and a lower tongue 84 with a guide lip 85 on the bottom side thereof. The tongue 84, in cooperation with the notch 83 forms a receptacle that it will slide over and receive, and in turn support a horizontal tubular member 37 of a wheelchair that is positioned properly on the stand.

Thus, the clamps 76 clamp both the respective upright frame members 36 of the wheelchair as well as the connected horizontal frame members 37. The upright and horizontal frame members of the stand on each side of the wheelchair are conventionally made into a "T" intersection, which fits into the respective receptacle 82 and notches 83 of the respective clamp 76.

In order to accommodate wheelchairs that have a different height of the lower horizontal frame members 37, subframe 73 is capable of being raised and lowered relative to the sleeves 39 and thus relative to the main support frame 11 and the floor or support surface for the wheelchair through the use of a gear and screw drive, that can be manually (or power) operated to raise and lower the subframe 73 and thus the lower clamps 76.

Figure 5:
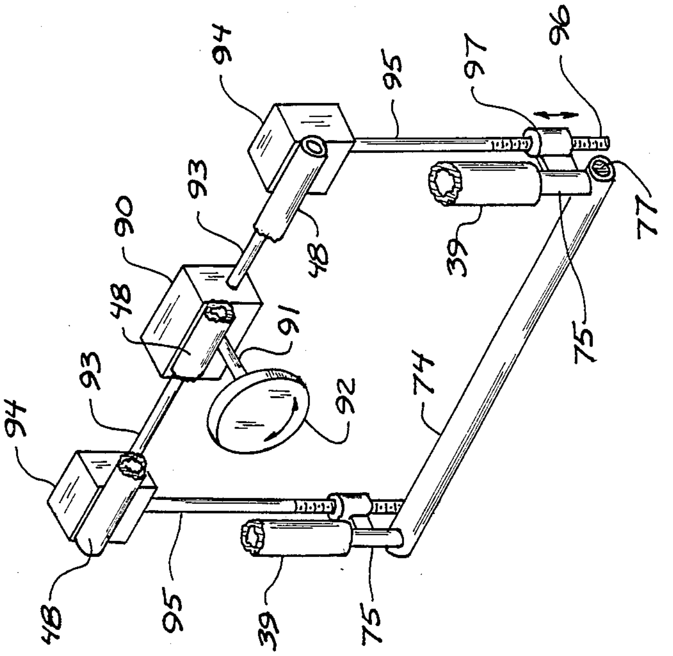
FIG. 5 is a schematic representation of an adjusting device used with the clamps of the present invention.

As shown in FIG. 5 schematically, and also as can be seen in FIGS. 1, 2 and 4, the cross member 48 is used to support three small gear boxes. A center gear box 90 comprises a right angle drive gear box, and has an input shaft 91 that is driven by a hand wheel 92. The hand wheel 92 is suitably supported in the member 47, and when rotated the internal gears in the box 90 (they are bevel gears) will drive an output shaft 93 that extends at right angles to the input shaft 91. Output shaft 93 is rotatably mounted on suitable bearings in the center box 90, and extends into outer edge gear boxes 94, which in turn are also mounted on the cross member 48 just to the interior of the clamps 58. The gear boxes 94,94 are right angle drive boxes as well, and gears on the shafts 93 drive output shafts 95 that have threaded end portions 96, at their outer ends. The shafts 95 extend downwardly as can be seen in FIG. 1, and are threadably engaged in threaded sleeves 97 which in turn are fixed to the exterior of tubes 75 on each side of the pivoting frame.

Thus, by turning the handwheel 91, the shafts 95 will be driven in a proper direction (the gears in gear boxes 94 can be positioned to obtain the proper direction of drive) and when this is done, the threaded sleeves 97 and the attached tubes 75 will be moved up or down. The tubes 75 will telescope in the sleeves 39 until the clamps 76 reach the proper height for the particular horizontal lower frame member 37 of the wheelchair 30 that is to be used.

The telescoping shafts 77 are urged outwardly with respect to the cross member 74 by the springs 80, and the clamps 76 are retracted inwardly against the spring load through the use of solenoids 100 that are connected to lugs 101 that are fixed to the cross member 74 (see the right-hand side in FIG. 2) and the solenoids 100 have actuators 103 that engage lugs shown at 104 (see FIG. 4) that are fixed to the shafts 77 used for mounting the clamps 76. When the solenoids 100 are energized (the left-hand solenoid in FIG. 2 is omitted for clarity), the clamps 76 will be retracted to the position shown on the right-hand side of FIG. 2, so that they will clear the upright frame member 36 of the wheelchair as well as the lower horizontal member 37 of the wheelchair.

Then, when the solenoids 100 are relaxed, the springs 80 will force the clamps 76 outwardly to securely engage the lower horizontal member 37 of a wheelchair as well as the upright member 36 of the wheelchair.

When solenoids 63 and 100 are relaxed, or de-energized, the springs 60 force the clamps 58 to engage the wheelchair frame member 36, and the springs 80 will force the clamps 76 to move outwardly engaging the lower ends of the upright frame members 36 of the wheelchair as well as the lower horizontal members 37 of the wheelchair that is positioned in the tilting frame or stand. The wheelchair will be held very securely.

The wheelchair is thus securely locked in position on the tilting frame or subframe and cannot be moved out of position. The wheelchair is then ready to be tilted.

Figure 7:
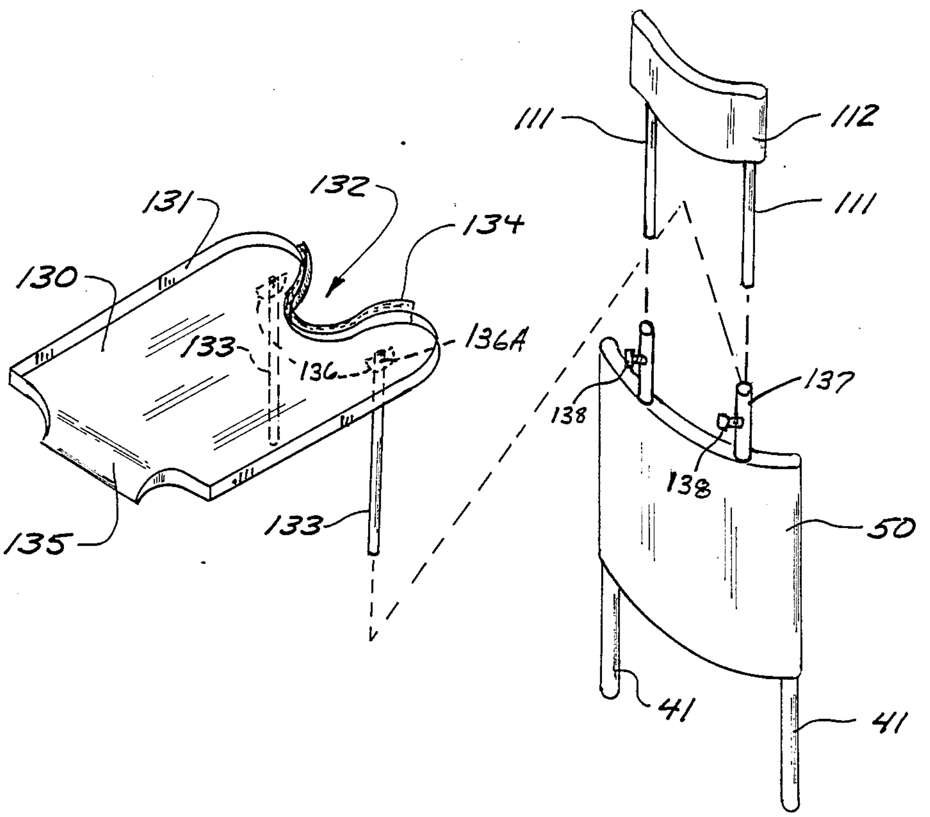
FIG. 7 is an exploded view showing a drain pan that is used in the supports which are also used for a headrest.

It should also be noted that the backrest 50 has a pair of tubes that open to the upper edge thereof, and these tubes are shown in dotted lines in FIG. 2 at 110. The tubes will receive a pair of spaced shafts 133 that support a drain pan 130 as shown in FIGS. 6 and 7 or an optional headrest shown in FIGS. 1 through 3, which normally is padded in a known manner. The drain pan and the optional headrest both can be adjustable up and down a substantial amount to adjust for different height people.

The height or vertical position of the headrest can be changed using hand tightenable wing head bolts or set screws 114 threaded into the backrest and the tubes 110 so that they bear against the shafts 111 and the height of the headrest relative to the backrest can be adjusted by loosening bolts 114 and moving the headrest and then retightening the bolts. In other words, the headrest can be adjusted in height for people of different height and still support the head.

In order to tilt or recline the tilting frame 40, a linear actuator assembly indicated generally at 115 is used. Linear actuators are, in the form shown, electrically operated and are conventionally available. Such actuators have very smooth operation, and usually use a ball screw. The actuator assembly 115 includes an electric drive motor 116 and a screw housing 117, that in turn has an extendable and retractable actuator screw or shaft 118 at the end thereof. The shaft 118 is conventional in a linear actuator, and is coupled with a pivot pin 120 to a bracket indicated at 121 in FIGS. 2 and 6 that is fixed to the lower end of the arm 45. As was previously explained, the arm 45 is fixed to the frame members 44,44 and to the upright members 41,41 through the sleeve portions 39, so that the entire tilt frame 40, including the arm 45, is pivotally mounted on the hubs 42 with respect to the pin 43.

Upon operating the motor 116, through the switch contained on the control 68, the linear actuator shaft 118 can be extended so that the tilt frame 40 can be moved to position shown in FIG. 6, with the backrest tilted rearwardly a desired amount. Actually, the amount of tilt can be more than that shown in FIG. 6, if desired, but it is tilted enough so that a person sitting in the wheelchair held on the tilt frame will have the upper edge of the backrest tilted outwardly enough so that it will be adjacent to a sink or wash basin in which the patient's hair is to be washed.

The pivoting arm 69 holding the control switch can be swung out of the way so that the stand 10 can be moved adjacent to the basin. The brakes shown schematically at 14 can be locked so that the base frame 11 is very stable when it is positioned adjacent to the desired location.

FIG. 6 shows a drain pan or drain tray 130 used with the stand when shampooing a chair occupant's hair. The drain tray 130 is put into position before tilting the stand and retained wheechair. The tray fits at the neck of the chair occupant to catch water when shampooing and can be adjusted up and down as shown by the double arrow 133A in FIG. 6.

In FIG. 7, there is a also schematic illustration of the drain tray 130 that is mounted in place of the headrest 112. Tray 130 has an upright rim or edge wall 131 around its perimeter except at the back where a drain lip 135 is provided. A recess 132 is provided at the front edge for receiving and fitting along the neck of a person in the wheelchair. Wall 131 has padding 134 lining the neck recess for comfort and also to make a reasonable water seal for the neck opening. The tray 130 has a pair of shafts 133 pivotally mounted thereon about a generally horizontal pivot axis using brackets 136 and suitable pivot bolts 136A. The draining angle of the tray can be adjusted and the pivot bolts 136A on brackets 136 can be tightened to hold the tray.

Also shown in FIG. 7 is an alternate support system for the drain tray and headrest. The alternate support comprises a pair of tubes 137 that are fixed to the backrest 50 at the proper spacing and which extend above the upper edge of the backrest a desired amount. A setscrew 138 is threaded into an opening in the wall of each tube 137 so when tightened against the shafts 133 of the drain pan or shafts 111 of the headrest (whichever is in place), it will hold the respective shaft in position at the desired level for the tray or headrest.

The shafts 133 depend from the tray 130 and these shafts 133 are of size so that they will fit into the tubes 137 shown in FIG. 7. Once the shafts 133 are in place, the set screws 138 are tightened. The height of the tray thus can be adjusted for persons of different heights as shown and tilted as well. The drain lip or apron 135 at the rear edge tray which will extend into a basin or sink, and the tray surface provides a drain for water used when shampooing a person sitting in the tilted wheelchair.

The pivotal adjustment of the drain tray about permits adjusting for different sinks and positions of the tilting stand.

The tubes 110 in backrest 50 are spaced the same as the tubes 137 so shafts 133 of the tray will fit into these tubes 100 as well. The headrest 112 can be removed by loosening the set screws 114 or 138 and pulling it out of its support tubes. The shafts 133 then can be reinserted.

The stand is thus very simply used, because the stand can be easily wheeled to a proper position, the wheelchair is then latched or clamped into position, the tilt frame tilted, and the shampooing can proceed. If desired, however, the wheelchair can actually be fitted onto the stand and clamped in place prior to positioning adjacent to a wash basin. In other words, once the wheelchair is clamped on the stand, the wheelchair handles (or the chair drive wheels if the occupant is driving the work) can be used for maneuvering the wheelchair and stand to the desired location. The tilting can take place wherever there is a standard 110 volt receptacle, and the clamps 58 and 76 can have insulated surfaces or be plastic coated for insulation, if desired, for safety purposes.

Further, for safety purposes, there is an interlock circuit shown generally at 140 that is provided for preventing the solenoid control line 141 (which can have individual lines to each solenoid for selective control if desired) from being energized to retract the clamps 58 and 76 once the linear actuator shaft 118 is extended at a slight distance. This can be done with a suitable limit switch shown schematically at 142, so that as soon as the control arm 45 is moved away from its fully seated position, the limit switch 142 will provide a signal to the interlock 140 to prevent power from being transferred along the line 141 to the solenoids. Electronic sensing also can be used for disabling the solenoids as soon as the tilt frame is moved from its base position.

The stand greatly simplifies cleanliness and maintenance of hair of persons that are confined to wheelchairs, because it is a difficult task unless the seated person is reclined rearwardly so that water can drain from the head and hair easily. The stand can be used for reclining the chair at any time or for any purpose, not only for shampooing.

It should be noted in the drawings that the pivot axis of the pin 43 is rearwardly of the axis of rotation of the wheels of a wheelchair which is indicated at 150 in FIGS. 1 and 6, for example. This insures that the center of gravity of a person seated in the chair will be well forwardly of the pivot axis of shaft 43 in the initial position when the frame is being clamped to the wheelchair, and that the center of gravity does not move rearwardly of the pivot axis during a normal tilting range of movement as illustrated in FIG. 6.

It also, of course, should be understood that the actuator 115 could be hydraulic or an air cylinder if desired, or any other type of suitable power control. Additionally, the frame portions can be made of various configurations. It is important that the rearward tilting be positively stopped for safety purposes. A linear actuator provides such control and a positive stop at the end of a stroke as a safety feature. An external stop on the tilt frame could also be provided. It should be noted that the stand will work even without a power operator, in that a person assisting the chair occupant, once the chair is clamped to the tilt frame, can tilt the chair rearwardly very safely under manual control of the stand so long as there is a stop that will hold the stand and wheelchair in its desired tilted position. The clamping of the wheelchair can be done with straps or other types of clamps as well.

The backrest provides a feeling of comfort and security, and particularly where the backrest of the wheelchair is flexible, as in many of the chairs at the present time, the backrest of the stand of the present invention insures that the person seated has a feeling of security during the tilting operation.

The chair occupant can operate the tilt stand if the stand controls are made accessible along the side of the chair. The clamp will clamp securely and as long as water controls are also available, the occupant can shampoo without assistance.

Although the present invention has been described with reference to preferred embodiments, workers skilled in the art will recognize that changes may be made in form and detail without departing from the spirit and scope of the invention.

What is claimed is:

1. For use in combination with a wheelchair having a frame for supporting a patient including a seat for seating the patient and frame members, the improvement comprising:

- a stand for receiving and tilting such a wheelchair including a stand frame, said stand frame having first and second portions, the first frame portion being adapted to be supported on a supporting surface, and the second frame portion being pivotally mounted about a generally horizontal axis with respect to the first frame portion;
- said stand frame being constructed to be positionable adjacent a wheelchair to be tilted, and with the second frame portion adjacent the rear of such a wheelchair;
- means for coupling a wheelchair to the second frame portion comprising clamps having receptacles for receiving frame members of a wheelchair to be tilted, said receptacles including means for receiving a generally uprightly extending frame member and a generally horizontally extending frame member of a wheelchair to be tilted by the stand on each of the sides of the second frame portion; and
- means operable between the first and second frame portions for permitting tilting of the second frame portion relative to the first frame portion subsequent to coupling a wheelchair to the second frame portion, and to retain the second frame portion in a tilted position.

2. The improvement of claim 1 wherein said clamps are slidably mounted on opposite sides of the second frame portion and means to spring load the clamps laterally outwardly from the second frame portion to engage frame members of a wheelchair operably positioned relative to the stand frame.

3. The improvement of claim 2 including power means for retracting the clamps against the action of the spring load to permit a wheelchair to be placed in operable position adjacent said frame and the power means being releasable for clamping such a wheelchair to the second frame portion.

4. The improvement of claim 2 and means for adjustably mounting the clamps for clamping on horizontal frame members of a wheelchair on the second frame portion, the clamps for clamping on horizontal frame members being vertically spaced from other clamps used for clamping onto vertical frame portions of a wheelchair to be tilted.

5. The improvement of claim 1 wherein said means operable for permitting tilting comprises power means acting between said first frame portion and said second frame portion.

6. The improvement of claim 5 wherein power means comprises a linear actuator having an extendable and retractable rod for power operation, and an arm coupled to said second frame portion and acted upon by the extendable and retractable rod at a position spaced from the pivot between the first and second frame portions.

7. A stand for reclining a chair support on which a person is seated, said chair support having frame means for supporting a person, said stand comprising:

- a frame assembly including first and second frame portions;
- said first frame portion having means for supporting it relative to a supporting surface in position adjacent a chair support to be reclined;
- the second frame portion pivotally mounted to the first frame portion for pivoting about a substantially horizontal axis, and being positioned adjacent the back of a chair support when the first frame portion is in its position adjacent such chair support;
- means for receiving said chair support on said second frame portion;
- said second frame portion being tiltable relative to the first frame portion while the chair support is received thereon to permit inclining the rear portions of said chair support rearwardly with respect to the supporting surface;
- said first frame portion comprising a frame member that has a lateral width at the rear of the first frame portion substantially as wide as the chair support being lifted, and frame members tapering forwardly from the rear toward a center line of the first frame portion to provide a tricycle-type frame; and
- a caster wheel supporting the forward end of the first frame adjacent a central longitudinally extending axis thereof.

8. The apparatus of claim 7 and power means for controlling the position of said second frame portion relative to said first frame portion.

9. The apparatus as specified in claim 7 wherein the chair support to be supported comprises a wheelchair having wheel members, and laterally spaced side frame members, said first frame portion having a forward end being of size to fit underneath the seat of a wheelchair to be tilted, and with portions of the first frame member rearwardly of the wheels of such a wheelchair, the lateral side frame portions of such a wheelchair comprising upright members and generally horizontal lower members, and said means for securing including spring-loaded clamp members that are urged outwardly from lateral sides of said second frame portion, to engage the upright members and lower horizontal members of a wheelchair positioned adjacent the second frame portion, to securely clamp the wheelchair to the second frame portion under spring load.

10. The apparatus as specified in claim 9 and power means to retract said clamp members so that the lateral dimension of the second frame portion including the clamp members is less than the width of a frame of a wheelchair to be supported, whereby when the power means are energized the second frame portion can be moved to position adjacent such a wheelchair with the clamp means aligned with respective frame members of a wheelchair to be supported.

11. The apparatus as specified in claim 10 and adjustable means for adjusting the relative position of the clamp members that engage the lower frame portions of a wheelchair to be supported relative to clamp members that engage the upright frame members of a wheelchair to be supported on each side of the second frame portion.

12. For use in combination with a wheelchair having a frame for supporting a patient including a seat for seating the patient and frame members, the improvement comprising:

a stand for receiving and tilting such a wheelchair including a stand frame, said stand frame having first and second portions, the first frame portion being adapted to be supported on a supporting surface, and the second frame portion being pivotally mounted about a generally horizontal axis with respect to the first frame portion;

said stand frame being constructed to be positionable adjacent a wheelchair to be tilted, and with the second frame portion adjacent the rear of such a wheelchair; and said first frame portion comprising a rear axle member having a width substantially equal to the width of wheels on a wheelchair to be tilted, wheel means at opposite ends of said rear axle member for movably mounting the first frame portion, and the first frame portion also including a single forward frame member of size to fit underneath the seat of a wheelchair to be tilted, said single forward frame member being supported on a single caster wheel, and the axis between said first and second frame portions being positioned rearwardly of the center of gravity of a wheelchair to be tilted;

means for coupling a wheelchair to the second frame portion; and means operable between the first and second frame portions for permitting tilting of the second frame portion relative to the first frame portion subsequent to coupling a wheelchair to the second frame portion, and to retain the second frame portion in a tilted position.

13. The improvement of claim 12 wherein said means for coupling comprises spring-loaded clamp members engaging frame portions of a wheelchair to be tilted.

14. The improvement of claim 12 including brake means for locking at least one of the wheels supporting the first frame portion relative to the support surface.

15. For use in combination with a wheelchair having a frame for supporting a patient including a seat for seating the patient and frame members, the improvement comprising:

a stand for receiving and tilting such a wheelchair including a stand frame, said stand frame having first and second portions, the first frame portion being adapted to be supported on a supporting surface, and the second frame portion being pivotally mounted about a generally horizontal axis with respect to the first frame portion;

said stand frame being constructed to be positionable adjacent a wheelchair to be tilted, and with the second frame portion adjacent the rear of such a wheelchair;

means for coupling a wheelchair to the second frame portion;

means operable between the first and second frame portions for permitting tilting of the second frame portion relative to the first frame portion subsequent to coupling a wheelchair to the second frame portion, and to retain the second frame portion in a tilted position;

said second frame portion including a backrest that extends upwardly from the axis of pivot between the first and second frame portions, said backrest providing support for a wheelchair to be tilted;

a headrest mounted on the backrest of said stand at the upper edge of the backrest, said headrest being adjustable in generally vertical direction for supporting a head of a patient in a wheelchair supported by said second frame portion; and a drain backrest tray mountable with respect to the backrest, said tray extending rearwardly of the backrest to provide a drain for water used for shampooing the hair of a patient in a wheelchair supported on said second frame portion.

16. The improvement of claim 15 and means to adjust the height of the drain tray relative to the back rest.

17. For use in combination with a wheelchair having a frame for supporting a patient including a seat for seating the patient and frame members, the improvement comprising:

a stand for receiving and tilting such a wheelchair including a stand frame, said stand frame having first and second portions, the first frame portion being adapted to be supported on a supporting surface, and the second frame portion being pivotally mounted about a generally horizontal axis with respect to the first frame portion;

said stand frame being constructed to be positionable adjacent a wheelchair to be tilted, and with the second frame portion adjacent the rear of such a wheelchair;

means for coupling a wheelchair to the second frame portion;

means operable between the first and second frame portions for permitting tilting of the second frame portion relative to the first frame portion subsequent to coupling a wheelchair to the second frame portion, and to retain the second frame portion in a tilted position; and said first portion comprising a tricycle-type support having three wheels, a pair of rear wheels that are spaced laterally for stability, and a forward caster wheel located substantially midway between the rear wheels and supported relative thereto and extending forwardly therefrom.

* * * * *